United States Patent [19]

Smith

[11] 4,209,855
[45] Jun. 24, 1980

[54] APPARATUS FOR CONTROLLING THE TRANSFER OF SEISMIC DATA FROM MAGNETIC TAPE STORAGE TO A PHOTOGRAPHIC RECORDING

[75] Inventor: Clarence G. Smith, Irving, Tex.

[73] Assignee: Mobil Oil Corporation, New York, N.Y.

[21] Appl. No.: 854,564

[22] Filed: Nov. 25, 1977

[51] Int. Cl.² ............................................. G01V 1/34
[52] U.S. Cl. .................................. 367/71; 367/50; 367/55; 346/33 C; 346/107 SC; 346/110 R
[58] Field of Search ............... 340/15.5 DS, 15.5 FC, 340/15.5 TG; 346/33 C, 33 WL, 107 SC, 110 R

[56] References Cited

U.S. PATENT DOCUMENTS

| | | | |
|---|---|---|---|
| 2,912,672 | 11/1959 | Loper | 340/15.5 DS |
| 3,173,743 | 3/1965 | Weissensteiner | 340/15.5 DS |
| 3,349,407 | 10/1967 | Hefer et al. | 346/110 R |
| 3,588,911 | 6/1971 | Luke et al. | 340/15.5 DS |
| 3,611,406 | 10/1971 | Hughes | 340/15.5 DS |
| 3,704,450 | 11/1972 | Smith | 340/172.5 |
| 3,714,663 | 1/1973 | Smith | 346/110 R |
| 3,886,526 | 5/1975 | Smith | 340/15.5 DS |
| 3,916,370 | 10/1975 | Neeley | 340/15.5 DS |
| 3,916,372 | 10/1975 | Elliott | 340/15.5 DS |
| 3,979,714 | 9/1976 | Zemanek, Jr. | 340/15.5 DS |
| 4,010,476 | 3/1977 | Elliot | 346/110 R |

Primary Examiner—Howard A. Birmiel
Attorney, Agent, or Firm—C. A. Huggett; William J. Scherback

[57] ABSTRACT

Multiplexed seismic data representing a plurality of seismic channels intensity modulates each sweep of the electron beam of a cathode-ray tube. Each successive sweep of the electron beam is photographically reproduced on a rotating drum plotter to provide a seismic record section. The modulation of the cathode-ray tube is further controlled to provide for various seismic trace presentations on the record section, including wiggle traces, variable area traces, wiggle-variable area traces, and symmetrical-variable area traces.

5 Claims, 18 Drawing Figures

TRACE MODULATOR

CLOCK CONTROL

CHANNEL 24
TRACE MULTIPLEXER
TIMING CONTROL

FIG. 6

SEISMIC INPUT  FIG. 7A

STOP 24  FIG. 7B

$\overline{\text{STOP 24}}$  FIG. 7C

WIGGLE PULSES  FIG. 7D

CRT WIGGLE DISPLAY  FIG. 7E

START T24  FIG. 7F

VA PULSES  FIG. 7G

CRT VA DISPLAY  FIG. 7H

WIGGLE-VA PULSES  FIG. 7I

CRT WIGGLE-VA DISPLAY  FIG. 7J

SYM. VA PULSES  FIG. 7K

CRT SYM. VA DISPLAY  FIG. 7L

APPARATUS FOR CONTROLLING THE TRANSFER OF SEISMIC DATA FROM MAGNETIC TAPE STORAGE TO A PHOTOGRAPHIC RECORDING

BACKGROUND OF THE INVENTION

Seismic data representing a plurality of seismic channels is conventionally digitized and stored on magnetic tape for further data processing. In one such data processing operation, the information stored on the magnetic tape is used to modulate a cathode-ray tube so as to display the information on the face of the cathode-ray tube. Such display can then be photographically reproduced by means of a conventional drum plotter. The photographic reproduction obtained is a series of traces, one such trace for each seismic channel, recorded in a parallel relationship. In such data processing operations, the digitized seismic data stored on magnetic tape is converted to seismic analog signals. These analog signals are then multiplexed so as to provide intensity-modulation pulses for application to the electron beam of a cathode-ray tube as it sweeps across the face of the display. One intensity-modulation pulse is provided during each sweep of the electron beam for each of the seismic channels. Rotation of the drum plotter past the face of the cathode-ray tube results in each sweep of the electron beam being recorded on the drum plotter in a position displaced from the previous sweep, resulting therefrom in a series of seismic trace recordings on the photographic material surrounding the drum plotter. Timing lines are produced on the photographic material at fixed time intervals along the length of the seismic trace recordings.

Timing numbers can be photographically produced on the seismic trace to identify the timing lines in accordance with the teaching of U.S. Pat. No. 3,714,663 to Clarence G. Smith. Selected seismic traces can be marked with lines through the center of the traces for the entire length so that they are readily distinguishable from other seismic traces in accordance with the teaching of U.S. Pat. No. 3,704,450 to Clarence G. Smith. Seismic traces may be annotated with alpha-numeric characters to identify such things as section type, area, shotpoint, etc., in accordance with the teaching of U.S. Pat. No. 3,886,526 to Clarence G. Smith.

SUMMARY OF THE INVENTION

The present invention is directed to a seismic data processing system for photographically reproducing seismic data from a plurality of seismic channels. A multiplexer successively applies seismic data for each of a plurality of seismic channels to a cathode-ray tube to successively intensity modulate the electron beam one time during each sweep of the electron beam across the face of the cathode-ray tube for each of the seismic channels. A drum plotter photographically records in a side-by-side relationship each sweep of the electron beam. More particularly, a signal is produced identifying a desired trace position on the face of the cathode-ray tube for the location of the zero amplitude point for each of the seismic channels. This trace position signal is varied in response to variations in amplitude of the seismic data during successive sweeps of the electron beam. There is also produced a plurality of equally spaced sweep signals, identifying at any given time the location of the electron beam during its sweep across the cathode-ray tube. The variable trace position signal is compared with the plurality of sweep signals to produce a second signal when the desired trace position identified by the variable trace position signal is reached during each sweep of the electron beam. The electron beam is then modulated during each sweep in response to this second signal whereby the recording of successive sweeps of the electron beam produces a seismic trace that varies about its zero amplitude point at the desired trace position on the cathode-ray tube.

In a further aspect, a plurality of timing signals are produced during each sweep of the electron beam identifying equally spaced centerpoints on the cathode-ray tube for each of the seismic channels. Each sweep of the electron beam is modulated beginning with the occurrence of the variable trace position signal for a given channel and ending with the occurrence of the centerpoint timing signal for the given channel whereby the photographic recording is in the form of a variable area presentation of the seismic data.

In a still further aspect, the modulation of the electron beam is continued for a given channel for a time subsequent to the occurrence of the centerpoint timing signal equal to that time by which the second signal precedes the centerpoint timing signal whereby the photographic recording is in the form of a symmetrical-variable area presentation of the seismic data.

BRIEF DESCRIPTION OF THE DRAWINGS

FIGS. 7A–7L is a series of waveforms representing signals required for producing the plurality of illustrated CRT displays.

DESCRIPTION OF THE PREFERRED EMBODIMENT

Figure 1:
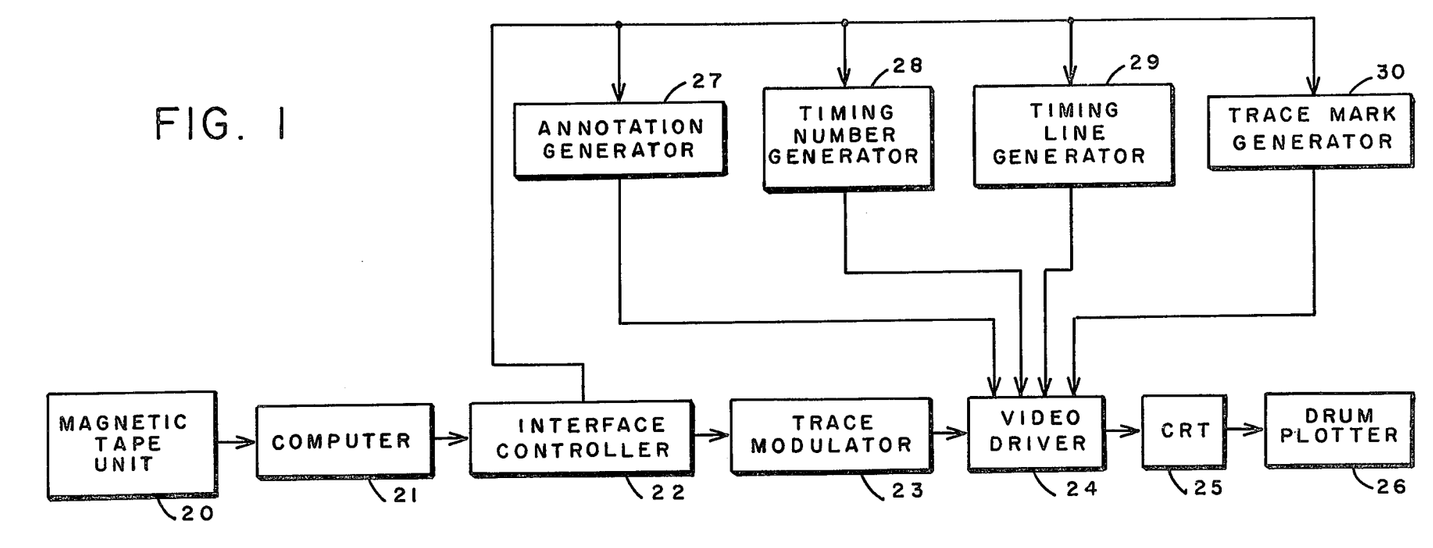
FIG. 1 is a block diagram schematic of one embodiment of the present invention.
Figure 2:
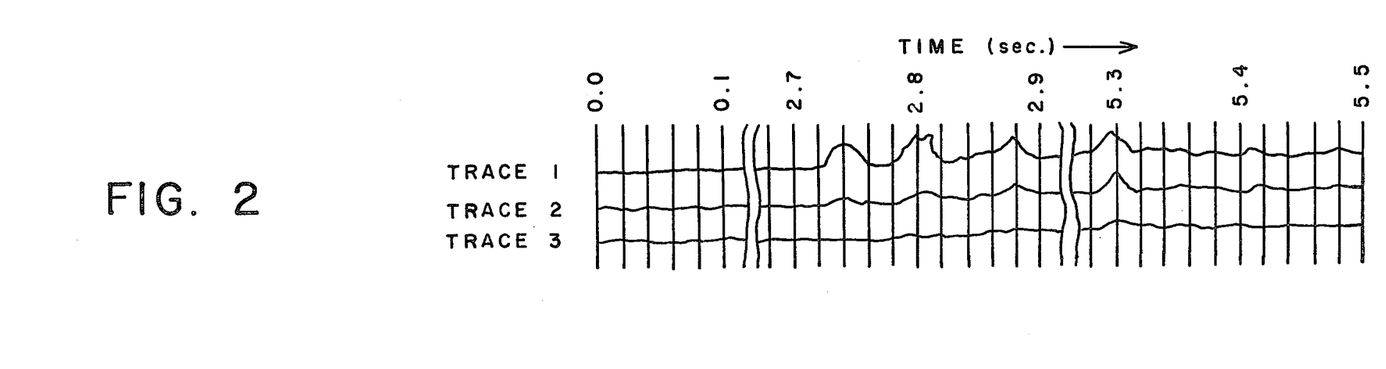
FIG. 2 illustrates 24 seismic traces which have been recorded by the embodiment of the present invention.

A seismic trace display and photographic recording system is illustrated in FIG. 1. Such a system includes a magnetic tape unit 20 and a computer 21 for supplying seismic trace digital signals to an interface controller 22. The interface controller 22 converts the seismic trace digital signals to analog signals and applies these signals to the trace modulator 23. The trace modulator 23 accepts and converts 24 channels of seismic analog signals to multiplexed seismic data. The multiplexed data is then applied by way of video driver 24, which operates as an OR gate, to the cathode-ray tube 25 for intensity modulation of the electron beam. Trace modulator 23 also supplies to the cathode-ray tube a horizontal ramp signal for controlling the sweep of the electron beam across the face of the cathode-ray tube. The multiplexed data successively intensity modulates the electron beam one time during each sweep of the electron beam across the face of the cathode-ray tube for each of the 24 seismic channels. The display on the face of the cathode-ray tube is focused onto a plotter 26. Plotter 26 comprises a rotatable drum around which is placed a photosensitive film or paper on which is recorded the display presented on the face of the cathode-ray tube 25. Each successive sweep of the electron beam on the face of the cathode-ray tube is photographically reproduced on plotter 26 in a side-by-side relationship to produce a seismic trace display as illustrated in FIG. 2.

A magnetic tape unit 20 suitable for use with the foregoing-described system is the T.I. 951, a digital transport manufactured by Texas Instruments Incorporated, Dallas, Texas. The T.I. 951 stores magnetic tape input digital data in the memory of a computer 21. One such computer which is suitable for use with the present invention is the T.I. 980A, also manufactured by Texas Instruments Incorporated. The computer 21 sorts and transfers digital data to a buffer memory. The buffer memory transfers words under clock control to a digit register for conversion to analog signals. The analog signals are applied to the trace modulator 23 for transfer to cathode-ray tube 25. The memory buffer controls the next data rate from the magnetic tape to prevent the overflow or emptying of the memory until the transfer of analog signals to the trace modulator 23 is complete. This ensures that the subsequent display of the analog signals on the cathode-ray tube 25 will be at a continuous and uniform data rate.

A plotter 26 suitable for use with the system described herein is the PL-600 Series Cross-Section Plotter manufactured by Dresser, SIE, Inc., Houston, Texas. The PL-600 Cross-Section Plotter produces a 5.5-second photographic record at the rate of 7.5 inches per second. The cathode-ray tube 25 exposes only a small portion of the total plotter width in a given 24-seismic-trace plot. In order to plot additional 24-seismic-trace recordings adjacent to previous recordings, the camera is mounted on a movable assembly which may be automatically stepped laterally to the next 24-seismic-trace recording position.

The timing line generator 29 controls the recording on the plotter of three different widths of timing lines for 10-millisecond, 100-millisecond, and 1-second intervals.

The timing number generator 28 allows every 100 milliseconds of recording on the plotter 26 to be marked by a timing number adjacent to the 100-millisecond timing line. FIG. 2 represents the reproduction of, for example, three seismic traces on a 5.5-second photographic record. The 100-millisecond timing lines illustrated occur at 0.0, 0.1, 2.7, 2.8, 2.9, 5.3, 5.4, and 5.5 seconds. Timing number signals are applied to the cathode-ray tube to intensity modulate the electron beam at the appropriate time during those sweeps of the electron beam necessary for the production of a timing number on the seismic trace recording. For a more complete understanding of the operation of the timing number generator, reference may be made to the aforementioned U.S. Pat. No. 3,714,663 to Smith.

The trace mark generator 30 allows selected seismic traces reproduced on the plotter 26 to be marked by a single line drawn down the center of the seismic trace for the portion prior to time zero or the entire length of the trace. Any number of the seismic traces may be centerline marked and are selected by selector switches within the generator. A centerline pulse is produced once during each sweep of the electron beam across the face of the cathode-ray tube for each seismic trace selected by the setting of its selector switches. These centerline pulses are applied to the cathode-ray tube for the centerline marking of the seismic traces. For a more complete understanding of the operation of the trace mark generator, reference may be made to the aforementioned U.S. Pat. No. 3,704,450 to Smith.

The annotation generator 27 controls the plotting at a desired location around the drum of alpha-numeric data. This data may be used to annotate the seismic data to be plotted. The computer 21 supplies the annotation data to be plotted to the annotation generator along with various command signals for controlling the actual plotting of the annotation data. The Texas Instruments Model 980A Computer, for example, supplies 64 ASC II characters of data and various commands by way of two input/output data modules, one module handling the data and the other module handling the commands. The annotation generator under control of the computer will in turn control the plotting of 32 characters per line on the plotter 26 with different size and space selections.

Interface controller 22 provides for timing and control signals in response to command signals from the computer 21. Such timing and control signals direct the rotational speed of the drum plotter and the rate at which the seismic data is photographically recorded on such plotter. In a further aspect, these signals selectively enable at the proper times the timing line generator, the timing number generator, the trace mark generator, and the annotation generator for the further recording of the timing lines, the timing numbers, the centerline trace markings, and the alpha-numeric annotation data for identifying the seismic traces on the recording. For a more complete understanding of the operation of the interface controller, reference may be made to U.S. Pat. No. 3,916,370 to Walter P. Neeley.

With the foregoing understanding of the seismic trace display and photographic recording system as illustrated in FIG. 1, there will now be described a specific embodiment of the trace modulator 23 of the present invention.

Figure 3:
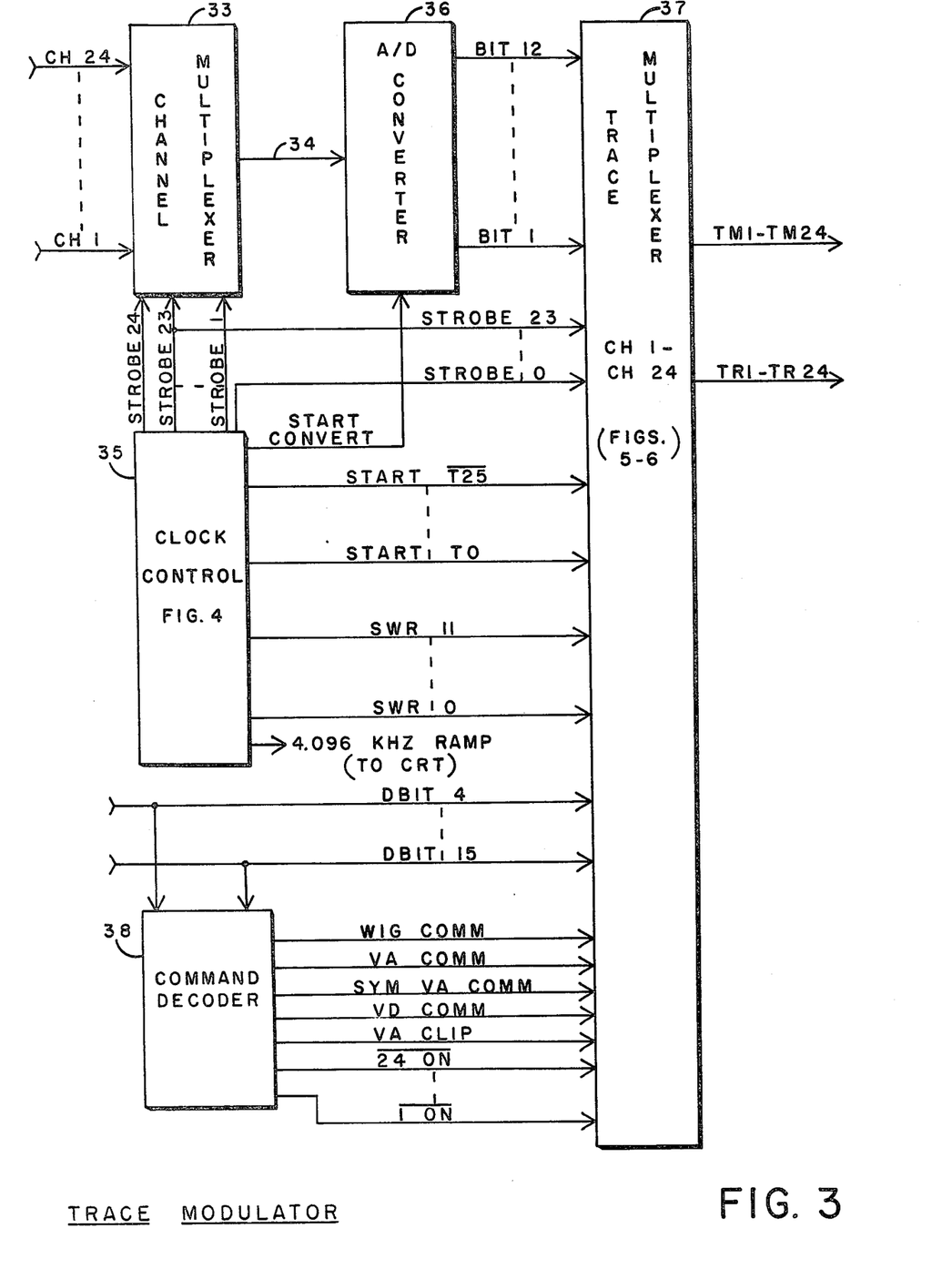
FIG. 3 is a block diagram schematic of the trace modulator of FIG. 1.

Trace Modulator (FIG. 3)

Referring now to FIG. 3, twenty-four analog channels of seismic data from the interface controller are applied to the channel multiplexer 33. Each analog channel, starting with channel 24, is switched onto the output line 34 in succession for 5.86 μsec each. The timing signals for effecting such switching are the STROBE 24 through STROBE 1 pulses provided by the clock control unit 35 during each sweep of the electron beam across the face of the cathode-ray tube. As each channel is put on the line 34, it is applied to the high-speed A/D converter 36 where it is digitized into a 10-bit digital sample. Each such digital sample is then strobed as the lower order 10 bits in a 12-bit word into its respective holding register in the trace multiplexer 37. The signals for strobing each digital sample into the trace multiplexer are the STROBE 23 - STROBE 0 pulses from the clock control unit 35. This means that each digitized sample for channels 24-1 is strobed into its respective holding register in the trace multiplexer 37 at the same time that the analog sample from the next succeeding channel is being output from the channel multiplexer 33 to the A/D converter 36.

Figure 4:
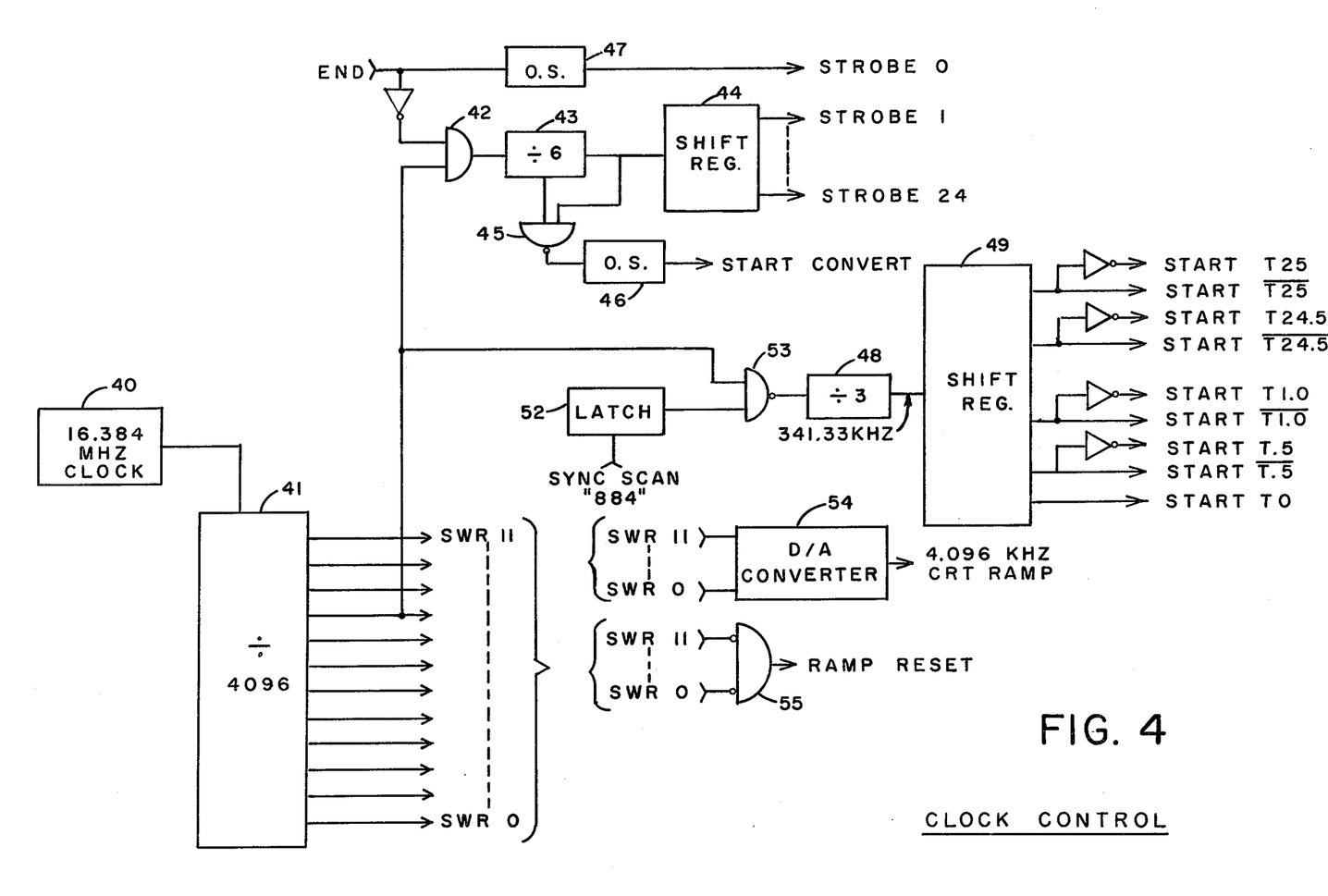
FIGS. 4, 5, and 6 are circuit schematics of the various units illustrated in FIG. 3.

Referring now to FIG. 4, the generation of the STROBE 24 - STROBE 0 pulses will be more fully described. A 12-bit binary counter 41 is driven by the 16.384-megahertz crystal oscillator 40. The divide-by-16 output of the counter 41 produces a 1.024-megahertz clock. The STROBE 24 - STROBE 1 pulses are derived from this 1.024-megahertz clock. Each time the horizontal ramp to the cathode-ray tube is reset, the 1.024-megahertz clock is passed by gate 42 to the divide-by-6 counter 43. This provides a 170.67-kilohertz clock to the shift register 44 which propagates a pulse down its length at the 170.67-kilohertz rate. Each such shift produces a 5.86-microsecond STROBE pulse from STROBE 24 - STROBE 1. Approximately 3 microseconds after each analog sample arrives at the A/D converter, a START CONVERT pulse from the 200-nanosecond one-shot 46 triggers the A/D converter to digitize the analog sample into a 10-bit digital sample. STROBE 0 is slightly different in that it is derived from the END pulse that stays up until the next RAMP RESET. A 5-microsecond one-shot 47 generates the STROBE 0 pulse.

Figure 5:
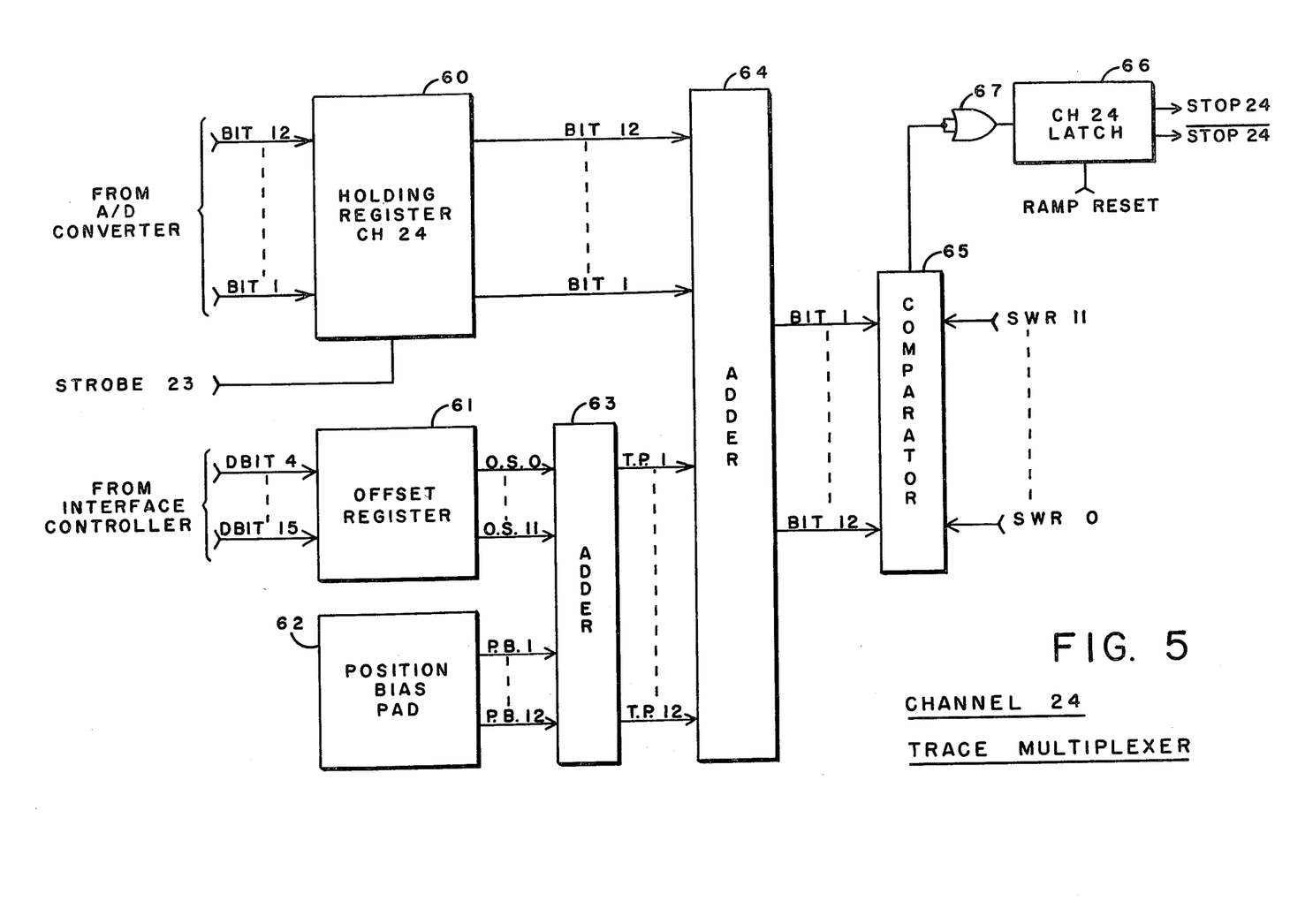
Figure 6:
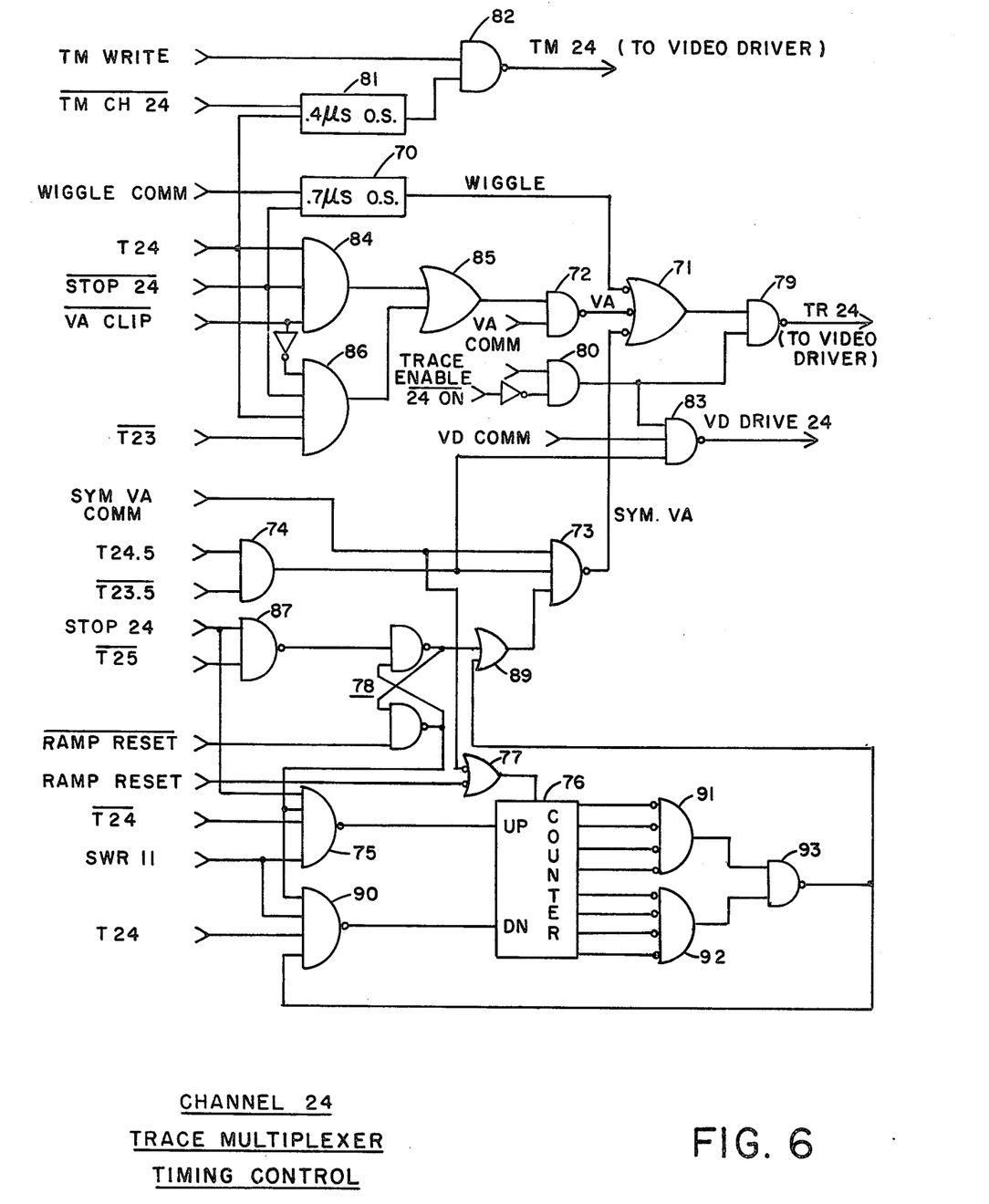

Trace Multiplexer (FIGS. 5 and 6)

Each of the 24 trace multiplexers is identical in configuration and similar in operation. Consequently, only the operation of the trace multiplexer 37 for channel 24 will be described herein in conjunction with FIGS. 5 and 6 and in conjunction with the waveforms of the signals produced by such trace multiplexer as illustrated in FIGS. 7A–7L.

Figures 7A, 7B:
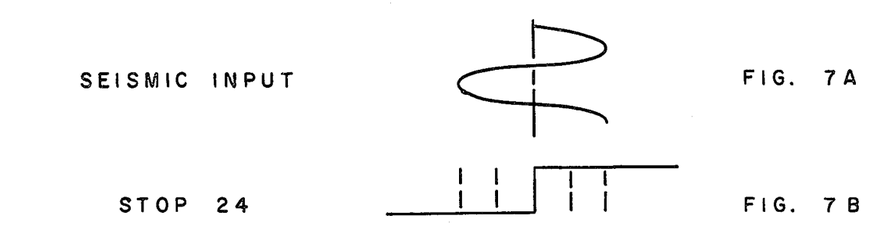
Figure 7C:
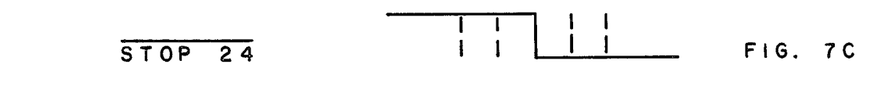
Figure 7D:
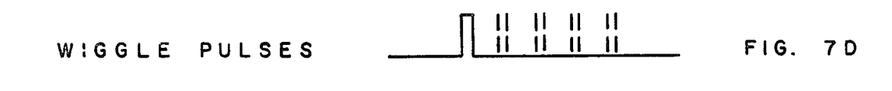
Figure 7E:
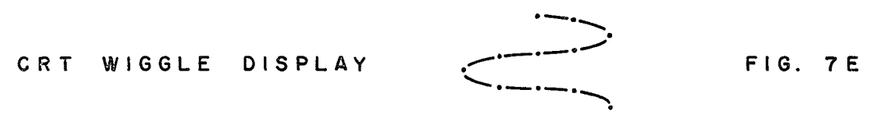
Figure 7F:
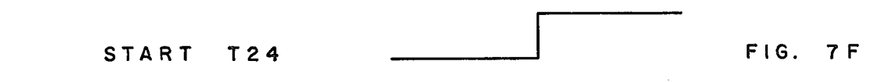
Figure 7G:
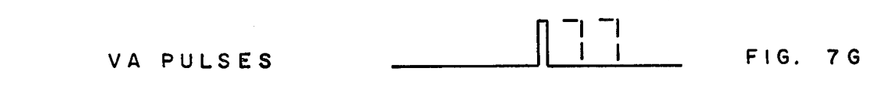

Referring first to FIG. 5, there is illustrated a preferred embodiment for the channel 24 trace multiplexer. In such embodiment, the digital seismic data representing the seismic analog signal of FIG. 7A is loaded into the holding register 60 in response to the STROBE 23 clock pulse. This data is then loaded into adder 64 along with trace position information from the adder 63. It is this information which is utilized to correctly position the channel 24 data on the face of the CRT. The combined seismic data and trace position information are compared by the comparator 65 with timing pulses SWR0–SWR11 which are synchronized with the ramp signal for sweeping the electron beam across the face of the CRT. These timing pulses are produced by the divider 41 of the clock control unit 35 (FIG. 4) which divides the 16.384-megahertz clock 40 by 4096. The CRT ramp signal is produced by the D/A converter 54 in response to the timing pulses. When the desired trace position on the CRT is reached by the sweep of the electron beam, the comparator 65 sets latch 66 through gate 67. When latch 66 is set, the STOP 24 and $\overline{\text{STOP 24}}$ outputs change state as illustrated in FIGS. 7B and 7C, respectively. The $\overline{\text{STOP 24}}$ pulse is utilized as illustrated in FIG. 6 to fire the 0.7-microsecond one-shot multivibrator 70 provided a WIGG COMM is present. A WIGG COMM will be present from the command decoder 38 when the desired seismic presentation to be recorded is a wiggle trace of the seismic data as illustrated in FIG. 7E, the center for the desired trace position on the CRT being identified by the centerline of the wiggle trace. As the seismic data varies in amplitude, the STOP and STOP pulses will vary forward or backward in time as illustrated in FIGS. 7B and 7C so as to fire the multivibrator 70 to produce the WIGGLE pulse illustrated in FIG. 7D. This WIGGLE pulse is applied by way of gates 71 and 79 as the TR24 pulse to the video driver 24 for modulation of the electron beam of the CRT. The resulting wiggle trace of FIG. 7E varies about the trace position, T.P., identified by the output of adder 63 of the trace multiplexer.

Such trace position is identified by the adder 63 in response to the combination of the outputs from the offset register 61 and position bias pad 62. Assuming all zeros in the offset register, the position bias pad 62 is set to produce a trace position signal from adder 63 that allows the STOP 24 and $\overline{\text{STOP 24}}$ signals to vary faithfully around the center of the desired trace position for channel 24 on the CRT and thereby reproduce the seismic data signal's movement around its zero amplitude point in the form of the wiggle trace of FIG. 7E.

In setting the position bias pad 62 in the preferred embodiment of the invention, consideration is given to the digital representation from the A/D converter 36 for the various analog inputs of the seismic data as illustrated in the following table.

TABLE I

| Analog Value | Digital Representation |
| --- | --- |
| +4.99 volts | 1 1 1 1 1 1 1 1 1 1 |
| 0.00 volt | 1 0 0 0 0 0 0 0 0 0 |
| −5.00 volts | 0 0 0 0 0 0 0 0 0 0 |

This digital representation is termed offset binary output. This offset is canceled by programming the position bias pad 62 to subtract the offset and at the same time enter by way of adder 63 the correct value for trace position. The programming pad for each successive seismic channel is programmed to be separated by 96 decimal counts of the sweep counter from the preceding pad. The basic sweep counter resolution of 61 nanoseconds times the 96 counts yields the center-to-center channel spacing of 5.86 microseconds. The 12-bit programming code for all 24 channels is listed in the following table.

TABLE II

| Channel | Digital Programming Code |
| --- | --- |
| 24 | 0 0 0 1 1 1 1 0 1 0 1 1 1 |
| 23 | 0 0 1 0 0 0 1 1 0 1 1 1 |
| 22 | 0 0 1 0 1 0 0 1 0 1 1 1 |
| 21 | 0 0 1 0 1 1 1 1 0 1 1 1 |
| 20 | 0 0 1 1 0 1 0 1 0 1 1 1 |
| 19 | 0 0 1 1 1 0 1 1 0 1 1 1 |
| 18 | 0 1 0 0 0 0 0 1 0 1 1 1 |
| 17 | 0 1 0 0 0 1 1 1 0 1 1 1 |
| 16 | 0 1 0 0 1 1 0 1 0 1 1 1 |
| 15 | 0 1 0 1 0 0 1 1 0 1 1 1 |
| 14 | 0 1 0 1 1 0 0 1 0 1 1 1 |
| 13 | 0 1 0 1 1 1 1 1 0 1 1 1 |
| 12 | 0 1 1 0 0 1 0 1 0 1 1 1 |
| 11 | 0 1 1 0 1 0 1 1 0 1 1 1 |
| 10 | 0 1 1 1 0 0 0 1 0 1 1 1 |
| 9 | 0 1 1 1 0 1 1 1 0 1 1 1 |
| 8 | 0 1 1 1 1 1 0 1 0 1 1 1 |
| 7 | 1 0 0 0 0 0 1 1 0 1 1 1 |
| 6 | 1 0 0 0 1 0 0 1 0 1 1 1 |
| 5 | 1 0 0 0 1 1 1 1 0 1 1 1 |
| 4 | 1 0 0 1 0 1 0 1 0 1 1 1 |
| 3 | 1 0 0 1 1 0 1 1 0 1 1 1 |
| 2 | 1 0 1 0 0 0 0 1 0 1 1 1 |
| 1 | 1 0 1 0 0 1 1 1 0 1 1 1 |

In a further aspect of the invention, the preferred embodiment further provides for additional displays other than the simple wiggle trace display of FIG. 7E. More particularly, there can be produced the variable area (VA) display of FIG. 7H, the wiggle-VA display of FIG. 7J, and the symmetrical-VA display of FIG. 7L.

Figure 7H:
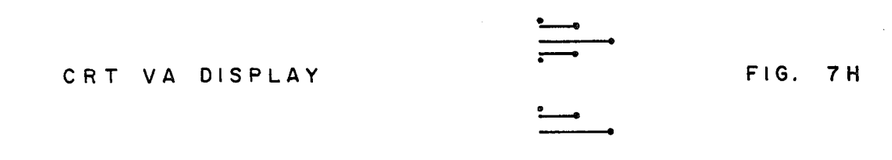
Figure 7I:
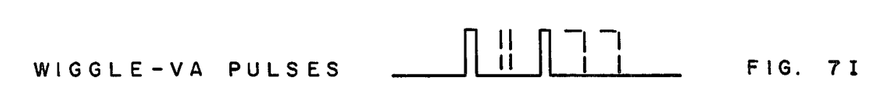

Referring first to the VA display of FIG. 7H, such display is produced when there is a VA COMM present from the command detector 38. Referring to FIG. 6, the START T24 and $\overline{\text{STOP 24}}$ pulses are applied through gate 84 and gate 85 to the gate 72 along with the VA COMM to provide for the VA pulse illustrated in FIG. 7G. Each VA pulse is applied by way of gates 71 and 79 as the TR24 pulse to the video driver for producing the VA display of FIG. 7H. Modulation of the CRT begins with the START T24 pulse and continues until the STOP 24 pulse changes state. All integer values of the START pulses represent the exact centerpoint for the respective seismic channel on the face of the CRT, the START pulse T24 for channel 24 being illustrated in FIG. 7F, the midpoints between channels being identified by the fractionated START pulses, and the channel-to-channel spacing of the START pulses being 5.86 microseconds. Such START pulses are established by dividing down the 1.024 MHZ clock of FIG. 4 by the divider 48 to produce a 341.33-KHZ clock. This clock propagates down the shift register 49 to produce the plurality of 5.86-microsecond START pulses T0–T25. When VA clipping is desired, the VA display for channel 24 is prevented from writing past the midpoint (START) of the display for the next succeeding channel 23 by the START T23 pulse to the gate 86. This pulse changes state so as to terminate the VA pulse of FIG. 7G by the disabling of gate 86. If VA clipping is not desired, gate 86 is disabled and gate 84 is enabled, allowing the full VA signal to be present from the START pulse to the STOP pulse of each displayed channel. The actual center of trace 24 may be displaced from the START 24 pulse during the VA display for presentation reasons. This requires that an offset be programmed into the offset register 61 of FIG. 5. This register offsets all seismic traces by the same amount with a resolution of 1/96th of the trace-to-trace spacing. However, with zeros programmed into the offset register, the center of each trace coincides with its respective START pulse when the position bias pad 62 is correctly programmed.

Figure 7J:
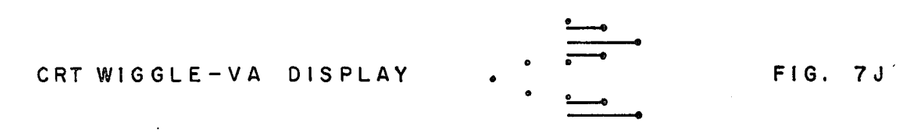

The wiggle-VA display of FIG. 7J is produced when both the WIGG COMM and the VA COMM are present. In this case, the WIGGLE pulses and the VA pulses are combined through gate 71 and as illustrated in FIG. 7J to modulate the CRT.

Figure 7K:
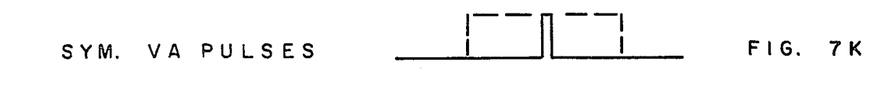
Figure 7L:
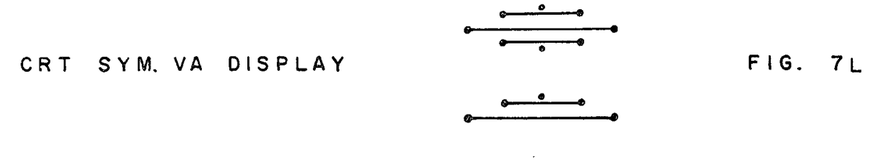

The symmetrical-VA display of FIG. 7L is produced by phase shifting the analog seismic input 180° at the input to the trace modulator when a SYM VA COMM is present. The START T24.5 and START T23.5 pulses are utilized by gate 74 to set clipping levels for the symmetrical VA presentation at either side of the START T24 pulse. The output of gate 74 is used to gate the SYM VA COMM through gate 73 in the following manner: (a) If the STOP 24 pulse changes state before the occurrence of the START T25 pulse, the output of gate 87 sets the latch 78. This disables gates 75 and 90 to prevent the counter 76 from running. This permits the SYM VA COMM to appear at the output of gate 73 so as to provide a maximum width TR24 pulse to be sent to the video driver. (b) If the STOP 24 pulse changes state after START T25 but before START T24, the latch 78 is not set and gate 75 applies the high-speed clock signal derived from SWR11 to be applied to the UP input of the counter 76. The counter starts counting up from zero. When START T24 and START T24 occur, gate 75 is disabled and gate 90 is enabled so as to apply the high-speed clock to the DOWN input of the counter. The counter then counts down to zero where it stops. During the time that the counter is counting upward and downward, the gates 91–93 and 87 enable gate 73 to pass the SYM VA pulse as illustrated in FIG. 7K. This occurs during the negative portions of the seismic input signal. (c) If the STOP 24 pulse changes state after START T24, there is no output from gate 73, indicating that portion of the symmetrical VA presentation during which the electron beam is not to be modulated. This occurs during the positive portions of the seismic input signal.

All of the signals for the various presentations are passed through OR gate 71 to be combined at AND gate 79 with the TRACE ENABLE and 24 ON signals from AND gate 80. TRACE ENABLE is provided by the interface controller 22 to gate all trace multiplexer signals to the video driver 24 but only for those trace multiplexers that are turned ON. The trace output TR24 is OR'd with the trace outputs from the other seismic channels to the video driver.

The TM WRITE and TM CH 24 signals control the plotting of trace marks. When enabled, the one-shot multivibrator 81 produces a 0.4-microsecond pulse to NAND gate 82 for each positive excursion of START T24. The output of gate 82 is OR'd with the trace mark outputs from the other seismic channels to the video driver.

A variable-density timing signal, VD DRIVE 24, is produced by NAND gate 83 when a VD COMMAND signal is present.

Various values and types of circuit components may be utilized for the circuits illustrated in FIGS. 2 and 3. In accordance with one specific circuit that has been successfully built and operated, the following TABLE III sets forth specific types and values of circuit components.

TABLE III

| Reference Designation | Description |
| --- | --- |
| A/D Converter 36 | ADC-EH10B2 (Datel) |
| D/A Converter 54 | DAC-HZ12DGC (Datel) |
| Multiplexer 33 | DG201BP (Siliconix) |
| Decoder 38 | 7442A (Texas Instruments) |
| Divider 43 | 7492A (Texas Instruments) |
| Divider 48 | 7492 (Texas Instruments) |
| Divider 41 | 74193 (Texas Instruments) |
| Shift registers 44 and 49 | 74164 (Texas Instruments) |
| Multivibrators 46 and 47 | 74121 (Texas Instruments) |
| Latches 52 and 66 | 7474 (Texas Instruments) |
| Registers 60 and 61 | 74174 (Texas Instruments) |
| Adders 63 and 64 | 74283 (Texas Instruments) |
| Comparator 65 | 74S85 (Texas Instruments) |
| Multivibrators 70 and 81 | 74221 (Texas Instruments) |
| Counter 76 | 74193 (Texas Instruments) |
| All Gates | 7400 Series (Texas Instruments) |

The foregoing circuit types and values have been given as illustrative of one embodiment of the present invention and can be taken as a general guide toward design of one such embodiment though it is understood that in other modifications other circuit values and types could be used.

I claim:

1. In a seismic data processing system for photographically reproducing seismic data from a plurality of seismic channels including a multiplexer for successively applying seismic data for each of said plurality of seismic channels to a cathode-ray tube to successively intensity modulate the electron beam one time during each sweep of the electron beam across the face of the cathode-ray tube for each of the seismic channels and a plotter for photographically recording in a side-by-side relationship each sweep of the electron beam, the method comprising the steps of:

(a) converting the seismic data for each seismic channel to an offset binary representation, (b) producing a first signal identifying a desired trace position on the face of the cathode-ray tube for the location of the zero amplitude point for each of the seismic channels, (c) producing a second signal representative of the time displacement of the true center of said offset binary representation from said desired trace position, (d) combining said first signal and said second signal to produce a third signal representative of the correct trace position on the face of the cathode-ray tube for said offset binary representation, (e) varying said third signal in response to variations in amplitude of said offset binary representation during successive sweeps of the electron beam, (f) producing a plurality of equally spaced sweep signals, identifying at any given time the location of the electron beam during its sweep across the cathode-ray tube, (g) comparing said variable third signal with said plurality of sweep signals to produce a fourth signal when the desired trace position identified by said variable third signal is reached during each sweep of the electron beam, and (h) modulating said electron beam during each sweep in response to said fourth signal whereby the recording of successive sweeps of the electron beam produces a seismic trace that varies about its zero amplitude point at the desired trace position on the cathode-ray tube.

2. The method of claim 1 further including the steps of:

(a) producing a plurality of timing signals during each sweep of the electron beam, identifying equally spaced centerpoints on the cathode-ray tube for each of the seismic channels, and (b) modulating each sweep of the electron beam beginning with the occurrence of said fourth signal for a given channel and ending with the occurrence of said centerpoint timing signal for the given channel whereby the photographic recording is in the form of a variable area presentation of the seismic data.

3. The method of claim 2 further including the step of continuing the modulation of the electron beam for a given channel for a time subsequent to said centerpoint timing signal equal to that time by which said fourth signal precedes said centerpoint timing signal whereby the photographic recording is in the form of a symmetrical-variable area presentation of the seismic data.

4. In a seismic data processing system for photographically reproducing seismic data from a plurality of seismic channels including a multiplexer for successively applying seismic data for each of said plurality of seismic channels to a cathode-ray tube to successively intensity modulate the electron beam one time during each sweep of the electron beam across the face of the cathode-ray tube for each of the seismic channels and a plotter for photographically recording in a side-by-side relationship each sweep of the electron beam, the combination therewith of:

(a) means for producing a first digital signal representative of a predetermined position on the cathode-ray tube for the modulation of the sweep of the electron beam for each seismic channel, (b) an analog-to-digital converter for converting the seismic data for each seismic channel into a second digital signal of an offset binary representation, (c) means for producing a third digital signal representative of the time displacement of the true center of said offset binary representation from said predetermined position, (d) an adder which combines said first digital signal and said third digital signal to produce a fourth digital signal representative of the correct trace position on the cathode-ray tube for said offset binary representation, (e) an adder which combines said second and fourth signals to modify the predetermined modulation position on the cathode-ray tube for each seismic channel, (f) means for producing a plurality of sweep signals identifying at any given time the location of the electron beam during its sweep across the cathode-ray tube, (g) a comparator for producing an output when the modified modulation position is reached during each sweep of the electron beam, and (h) means responsive to the output of said comparator for modulating the electron beam at said modified modulation position during its sweep across the cathode-ray tube.

5. The system of claim 4 further including:

(a) means for producing a plurality of timing signals during each sweep of the electron beam identifying equally spaced centerpoints on the cathode-ray tube for each seismic channel, (b) means for producing clock pulses, (c) an UP-DOWN counter that begins counting UP said clock pulses in response to the output of said comparator and begins counting DOWN in response to the occurrence of the timing signal corresponding to said seismic channel, and (d) means for modulating the sweep of the electron beam during the counting-UP and counting-DOWN period of said counter whereby a variable area presentation of the seismic data is photographically recorded.

* * * * *

UNITED STATES PATENT AND TRADEMARK OFFICE
CERTIFICATE OF CORRECTION

PATENT NO. : 4,209,855
DATED : June 24, 1980
INVENTOR(S) : Clarence G. Smith

It is certified that error appears in the above-identified patent and that said Letters Patent are hereby corrected as shown below:

Column 5, line 54 "STOP and STOP" should read -- STOP and STOP --.

Column 5, line 68 "STOP 24 AND STOP 24" should read -- STOP 24 and STOP 24 --.

Column 6, line 62 "detector" should read -- decoder --.

Signed and Sealed this

Twenty-sixth Day of August 1980

[SEAL]

Attest:

SIDNEY A. DIAMOND

Attesting Officer

Commissioner of Patents and Trademarks